United States Patent
De Berker et al.

(10) Patent No.: US 12,182,308 B2
(45) Date of Patent: Dec. 31, 2024

(54) REMOVAL OF SENSITIVE DATA FROM DOCUMENTS FOR USE AS TRAINING SETS

(71) Applicant: SERVICENOW CANADA INC., Montreal (CA)

(72) Inventors: Archy Otto De Berker, Montreal (CA); Philippe Guay, Montreal (CA); Dominique Tourillon, Montreal (CA); Etienne Marcotte, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 367 days.

(21) Appl. No.: 17/309,198

(22) PCT Filed: Nov. 7, 2019

(86) PCT No.: PCT/CA2019/051589
§ 371 (c)(1),
(2) Date: May 6, 2021

(87) PCT Pub. No.: WO2020/093165
PCT Pub. Date: May 14, 2020

(65) Prior Publication Data
US 2021/0397737 A1 Dec. 23, 2021

Related U.S. Application Data

(60) Provisional application No. 62/756,772, filed on Nov. 7, 2018.

(51) Int. Cl.
*G06F 21/62* (2013.01)
*G06F 18/21* (2023.01)
(Continued)

(52) U.S. Cl.
CPC ........ *G06F 21/6254* (2013.01); *G06F 18/214* (2023.01); *G06F 18/2178* (2023.01);
(Continued)

(58) Field of Classification Search
CPC .............. G06F 21/6254; G06F 18/214; G06F 18/2178; G06F 21/6245; G06F 2221/2143;
(Continued)

(56) References Cited

U.S. PATENT DOCUMENTS 6,377,688 B1 * 4/2002 Numao ................... H04L 9/302
726/21
10,025,952 B1 7/2018 Wang et al.
(Continued)

FOREIGN PATENT DOCUMENTS

CN 108509803 A * 9/2018 ............ G06F 21/32
JP 2005208890 A 8/2005
(Continued)

OTHER PUBLICATIONS

"The MITRE Identification Scrubber Toolkit: Design, training, and assessment", John Aberdeen et al., International Journal of Medical Informatics, Elsevier Scientific Publishers, Shannon, IR, vol. 79 No. 12, Dec. 1, 2010, pp. 849-859 XP027511365, ISSN: 1386-5056, DOI: 10.1016/J.IJMEDINF.2010.03.007.
(Continued)

*Primary Examiner* — Harunur Rashid
(74) *Attorney, Agent, or Firm* — FASKEN MARTINEAU DUMOULIN LLP; Dennis Haszko

(57) ABSTRACT

Systems and methods relating to the replacement or removal of sensitive data in images of documents. An initial image of a document with sensitive data is received at an execution module and changes are made based on the execution module's training. The changes include replacing or effectively removing the sensitive data from the image of the document. The resulting sanitized image is then sent to a user for validation of the changes. The feedback from the user is then used in training the execution module to refine
(Continued)

its behaviour when applying changes to other initial images of documents. To train the execution module, training data sets of document images with sensitive data manually tagged by users are used. The execution module thus learns to identify sensitive data and its submodules replace that sensitive data with suitable replacement data. The feedback from the user works to improve the resulting sanitized images from the execution module.

14 Claims, 6 Drawing Sheets

(51) Int. Cl.
- *G06F 18/214* (2023.01)
- *G06N 3/08* (2023.01)
- *G06V 10/82* (2022.01)
- *G06V 30/19* (2022.01)
- *G06V 30/414* (2022.01)
- *G06V 30/416* (2022.01)

(52) U.S. Cl.
CPC ........... *G06F 21/6245* (2013.01); *G06N 3/08* (2013.01); *G06V 10/82* (2022.01); *G06V 30/19167* (2022.01); *G06V 30/19173* (2022.01); *G06V 30/414* (2022.01); *G06V 30/416* (2022.01)

(58) Field of Classification Search
CPC . G06F 21/6209; G06F 18/24137; G06N 3/08; G06N 3/045; G06V 10/82; G06V 30/19167; G06V 30/19173; G06V 30/414; G06V 30/416; G06T 2207/20084; G06T 2207/30176; G06T 5/005
See application file for complete search history.

(56) References Cited

U.S. PATENT DOCUMENTS

| | | | | |
|---|---|---|---|---|
| 11,036,885 | B1* | 6/2021 | Abdelkader | G06F 21/606 |
| 2006/0031301 | A1 | 2/2006 | Herz et al. | |
| 2007/0047802 | A1 | 3/2007 | Puri | |
| 2008/0118150 | A1 | 5/2008 | Balakrishnan et al. | |
| 2010/0042583 | A1 | 2/2010 | Gervais et al. | |
| 2010/0205123 | A1* | 8/2010 | Sculley | G06F 21/562 707/E17.039 |
| 2011/0202850 | A1* | 8/2011 | Chan | G06F 21/606 715/745 |
| 2011/0255784 | A1 | 10/2011 | Welling et al. | |
| 2012/0041791 | A1 | 2/2012 | Gervais et al. | |
| 2012/0143728 | A1* | 6/2012 | Bhogal | G06Q 20/4016 709/204 |
| 2012/0259877 | A1* | 10/2012 | Raghunathan | G06F 21/6254 707/757 |
| 2012/0303558 | A1 | 11/2012 | Jaiswal | |
| 2013/0167192 | A1* | 6/2013 | Hickman | G06F 21/6245 726/1 |
| 2015/0199405 | A1* | 7/2015 | Redlich | G06F 16/282 707/770 |
| 2016/0224800 | A1 | 8/2016 | Bellert | |
| 2016/0239668 | A1* | 8/2016 | Bellert | G06F 21/10 |
| 2016/0364633 | A1 | 12/2016 | Yang et al. | |
| 2017/0068867 | A1 | 3/2017 | Lee et al. | |
| 2018/0129900 | A1 | 5/2018 | Kiraly et al. | |
| 2018/0144244 | A1 | 5/2018 | Masoud et al. | |
| 2018/0211117 | A1 | 7/2018 | Ratti | |
| 2019/0095644 | A1* | 3/2019 | Park | G06F 16/288 |

FOREIGN PATENT DOCUMENTS

| | | | |
|---|---|---|---|
| JP | 2007151897 | A | 6/2007 |
| JP | 5613855 | B1 | 10/2014 |
| JP | 2014195286 | A | 10/2014 |
| JP | 2015005172 | A | 1/2015 |
| JP | 2015114828 | A | 6/2015 |
| JP | 2018132894 | A | 8/2018 |
| WO | 2017043056 | A1 | 3/2017 |
| WO | 2017073373 | A1 | 5/2017 |
| WO | 2017134519 | A1 | 8/2017 |

OTHER PUBLICATIONS

Aberdeen et al., "The MITRE Identification Scrubber Toolkit: design, training, and assessment", International Journal of Medical Informatics, Dec 2010;79(12), pp. 849-859, doi: 10.1016/j.ijmedinf.2019.09.007.

* cited by examiner

REMOVAL OF SENSITIVE DATA FROM DOCUMENTS FOR USE AS TRAINING SETS

TECHNICAL FIELD

The present invention relates to document processing. More specifically, the present invention relates to systems and methods for replacing sensitive information in a document.

BACKGROUND

The early 21st century has been characterized with the rise and increasing ubiquity of machine learning in multiple industries. However, for machine learning to achieve next level penetration in the business world, machine learning has to be able to deal with the thousands of varied tasks that make businesses run. To be able to do this, machine learning systems will have to learn, refine, and, finally, execute such tasks. And, to be able to do this properly, machine learning systems will need access to large amounts of data. These large amounts of data can then be used to properly train such machine learning systems to implement various business processes.

It should be clear that such large amounts of data are available. Even with increasing use of automation in businesses, the business world still revolves around paper and its representations. As an example, business is still conducted with letters (on paper), with invoices (printed on paper), and receipts (printed on paper). While a paperless society has been much touted, the fact remains that paper is still widely used and, even if attempts are underway to phase out paper, it is unlikely that the form of the data on that paper will change any time soon. As an example of this, even paperless invoices and receipt still look the same as if they were on printed on paper.

Such paper records, invoices, and documents can be used to train machine learning systems to perform such business processes. However, this path is fraught with issues stemming from another major concern of the information technology revolution: privacy. Real world documents such as invoices, credit card receipts, medical reports, etc. all have information that people will not want to be available to others. To this end, there is therefore a need for systems and methods that can preserve the data and the privacy of users while still allowing real world documents to be used in training data sets for machine learning systems.

SUMMARY

The present invention provides systems and methods relating to the replacement or removal of sensitive data in images of documents. An initial image of a document with sensitive data is received at an execution module and changes are made based on the execution module's training. The changes include identifying, delineating, and replacing or effectively removing the sensitive data from the image of the document. The resulting sanitized image is then sent to a user for validation of the changes. The feedback from the user is used in further training the execution module to refine its behaviour when applying changes to other initial images of documents. To train the execution module, training data sets of document images with sensitive data manually tagged by users are used. The execution module thus learns to identify sensitive data and the module uses its submodules to replace that sensitive data with suitable replacement data. The feedback from the user works to improve the resulting sanitized images from the execution module.

In a first aspect, the present invention provides a method for replacing sensitive data in an image of a document, the method comprising:
 a) receiving an initial image of said document;
 b) passing said initial image through an execution module that applies at least one change to said initial image to result in a sanitized image of said document;
 c) sending said sanitized image to a user for validation;
 d) receiving user feedback regarding said sanitized image;
 e) using said user feedback to train said execution module;

wherein said at least one change includes an effective removal or a replacement of said sensitive data in said image.

In a second aspect, the present invention provides a method for replacing sensitive data in a document, the method comprising:
 a) receiving an initial version of said document;
 b) passing said initial version through an execution module that applies at least one change to said initial version to result in a sanitized version of said document;
 c) sending said sanitized version to a user for validation;
 d) receiving user feedback regarding said sanitized version;
 e) using said user feedback to train said execution module;

wherein said at least one change includes an effective removal or a replacement of said sensitive data in said document.

In a further aspect, the present invention provides a system for use in replacing sensitive data in a document, the system comprising:
 an execution module for receiving an initial version of said document and for applying at least one change to said initial version to result in a sanitized version of said document;
 a validation module for sending said sanitized version to a user for validation and for receiving feedback from said user;
 wherein
 said feedback is used for further training said execution module; and
 said at least one change includes an effective removal or a replacement of said sensitive data in said document.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention receives images of one or more documents containing sensitive data. The system according to this aspect of the invention is trained to locate, block off, and then replace the sensitive data in the one or more documents with replacement data. The system is trained by having users identify the sensitive data (i.e. "tag" the sensitive data) on the one or more documents. The system, by observing the tagged data, thus learns which data in the documents are to be tagged, blocked off (e.g. through the use of a bounding box), and then replaced. The replacement data may be randomly generated, may be generated with the assistance of a database of acceptable (i.e. non-sensitive data) data, or may be such that the sensitive data is effectively obfuscated/removed from the image of the one or more documents.

Figure 1:
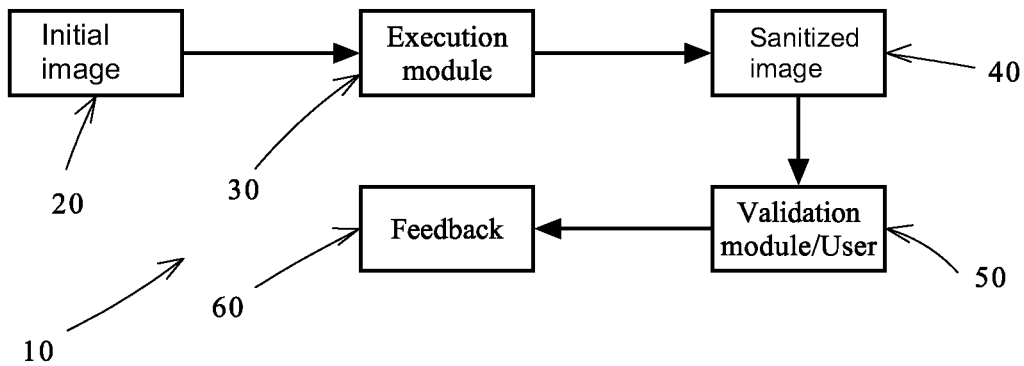
FIG. 1 is a block diagram of a system according to one aspect of the present invention.

Referring to FIG. 1, a block diagram of a system according to one aspect of the invention is illustrated. In this implementation, the system is configured to accept, label, and validate an unlabeled data set image. The system 10 has an image 20 of a document with sensitive data, an execution module 30, and a resulting sanitized image 40 of the same document. The initial image 20 of the document is received by the execution module 30 and the sensitive data in the image is tagged and/or replaced with replacement data by the execution module 30. The resulting sanitized image 40 is then sent to a user 50 for validation by way of a validation module. The user 50 confirms or edits the change applied by the execution module 30 to the initial image 20. The user feedback 60 can then be used to further train the execution module 30 in applying better changes to the initial image. Of course, where necessary and when necessary, one or more OCR (optical character recognition) processes may be applied to the image or to parts of the image to determine the characters and/or text within the image or within those parts of the image.

Figure 2:
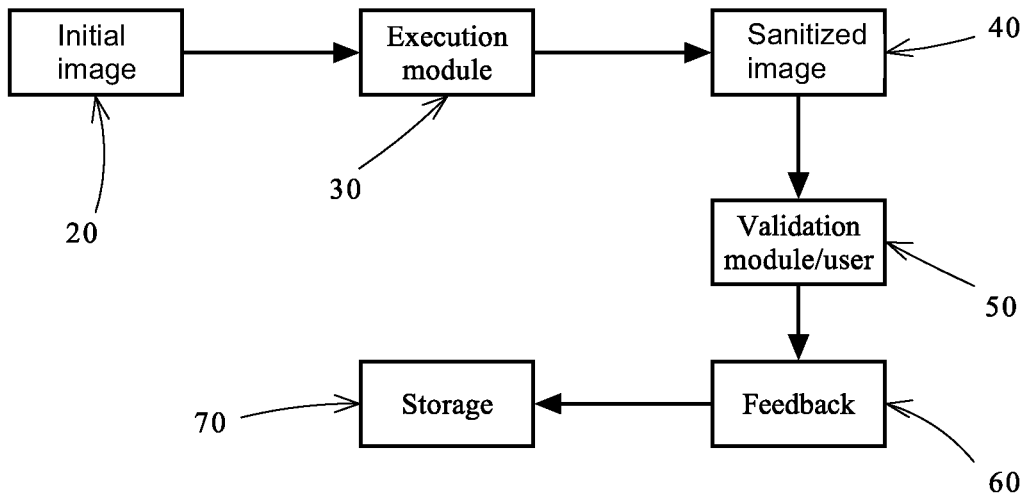
FIG. 2 is a block diagram of a variant of the system illustrated in FIG. 1.
Figure 3:
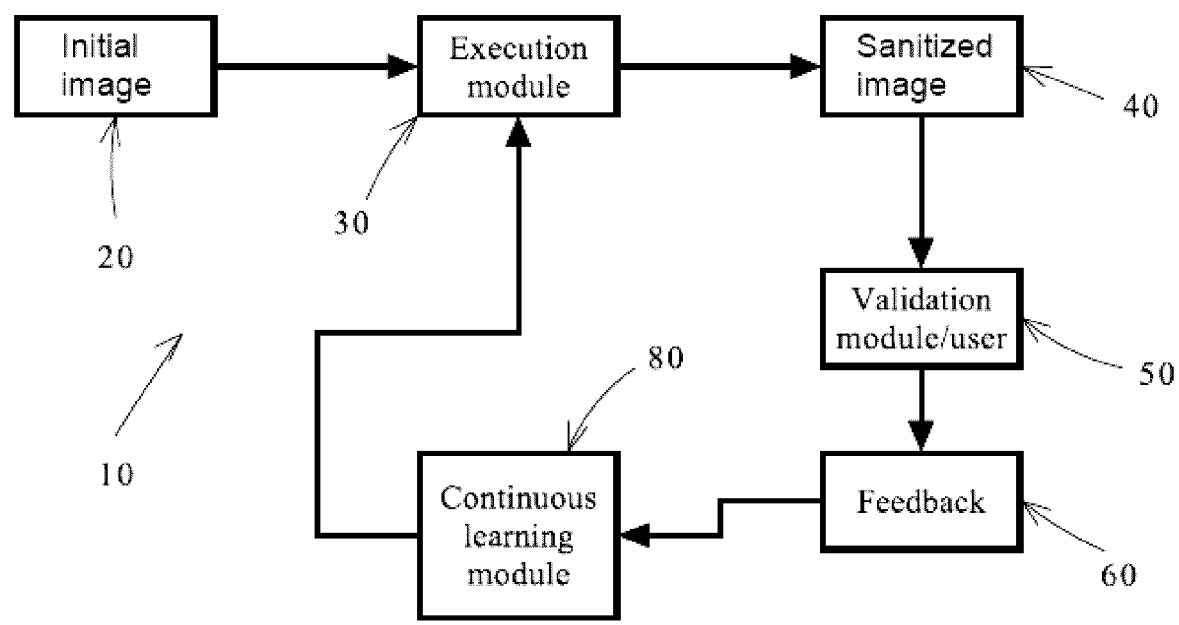
FIG. 3 is a block diagram of yet another variant of the system illustrated in FIG. 1.

In a variant of the present invention, referring to FIG. 2, the feedback 60 from the user is stored in a storage module 70 and is used in later training the behaviour of the execution module 30. Alternatively, in another variant illustrated in FIG. 3, the feedback 60 is sent to a continuous learning module 80 that adjusts the behaviour of the execution module 30 based on the feedback 60. In FIG. 3, the continuous learning module 80 continuously learns and adjusts the behaviour of how and what the execution module 30 applies to the initial image 20.

As can be imagined, once user 50 approves or validates the change applied to the initial image 20 to result in the sanitized image 40, this sanitized image 40 can be used in a training data set. However, should the user 50 disapprove and/or edit the change applied by the execution module, this disapproval and/or the edit is used to further train the execution module 30. It should be clear that the further training of the execution module 30 may be continuous (as in the configuration illustrated in FIG. 3) or it may be executed at different times, with collected data (i.e. user feedback) being applied as training data for the execution module (as in the configuration in FIG. 2).

It should be clear that, while the above description refers to an initial image and a sanitized image, in one aspect, the main difference between the two is the removal and/or replacement of sensitive data and/or sensitive text from the initial image to result in the sanitized image. It should also be noted that, while the description refers to the tagging and/or placement of bounding boxes around text, sensitive data may include non-text data. In another variant, the sanitized image may only have the sensitive data tagged/placed in bounding boxes for the user to validate. These clusters of sensitive data that have been tagged can then be replaced or effectively removed in a subsequent step.

In one implementation, the execution module 30 includes a convolutional neural network (CNN) that has been trained using images of documents where the sensitive data has been manually identified and/or tagged with the images being compiled into training data sets. These training data sets provide the CNN with examples of desired end results, e.g. images with sensitive data being delineated with bounding boxes. Once the CNN has been trained to recognize the sensitive data, part of the execution module 30 can then replace the sensitive data with suitable replacement data.

Figure 4:
FIG. 4 is an image of a document with clusters of sensitive data being delineated by bounding boxes.

In one example, illustrated in FIG. 4, the task for the system is to recognize specific data types and to place bounding boxes around areas in a claim form that had user entered data (i.e. the sensitive data). As can be seen from FIG. 4, the areas with bounding boxes included the sections containing personal information (e.g. name, address, data of birth, email address, and policy number). Once these clusters of data have been delimited with bounding boxes, the data within these bounding boxes can be replaced/removed using suitable replacement data. It should be clear that, once the data has been removed/replaced, the resulting image would be validated by a user. The user would be presented with the sanitized image and the user would merely need to confirm that the sensitive data has been replaced or effectively removed.

It should be clear that, once the execution module has been trained, images containing sensitive data can be received by the execution module and the desired change to each image can be applied by the execution module (i.e. the sensitive data can be bounded by the bounding boxes and the data within the bounding boxes can be replaced by suitable replacement data). Once this change has been applied, the resulting sanitized image is sent to a user for validation. Once validated, the sanitized image can be stored and used as part of a training data set. However, if the sanitized image is not suitable (e.g. the bounding box does not contain all of the sensitive data or at least some of the sensitive data has not been properly removed or replaced or the sensitive data has not been properly removed/replaced), the user can edit the change by blocking off the unreplaced or remaining sensitive data. Thus, the user can, for example, add a bounding box or change or add to the scope of a bounding box that has been applied to the image so that the sensitive data that needs to be bounded by the bounding box is within the box.

Once the user has edited the change applied to the labeled data set image, the edited data set image is then used as feedback. As noted above, this feedback can be used as part of a new training data set for use in further training the execution module.

It should also be clear that the various aspects of the invention encompass different variants. As an example, while the figures and the description above describe a "bounding box", the "box" that is used to delineate features in the image may not be box-shaped or rectangular/square shaped. Other shapes and delineation methods (e.g. point, line, polygon) are also possible and are covered by the present invention. As well, other configurations of such boxes and other configurations of the system are also covered by the present invention.

In one variant of the invention, the feedback used in training the execution module may take a number of forms. In a first variant, all the sanitized and validated images are used in training the execution module. In this variant, all the images with the correctly applied changes (i.e. images where the sensitive data has been correctly identified and removed/replaced) are used as feedback. Thus, if the execution module correctly applied the desired changes to the original or initial images, the resulting images are used as feedback. As well, if the execution module incorrectly applies a change (e.g. the sensitive data is not completely removed or replaced or the replacement data is inappropriate), the user corrected or user edited image with the change correctly applied (i.e. the sensitive data is properly delineated by a bounding box) is used as feedback as well. In this variant, the correctly applied changes would operate as reinforcement of the execution module's correct actions while the user corrected images should operate as being corrective of the execution module's incorrect actions.

In another variant to the above, only the user corrected images are used as feedback. For this variant, the labeled images to which the execution module has correctly applied the change would be passed on to be used as training data set images and would not form part of the feedback. This means that only the user edited or user corrected labeled images would be included in the feedback.

In a further variant of the system, the user validation may take the form of only approving or not approving the sanitized images from the execution module. In this variant, the disapproved data set images (i.e. the images where the change was incorrectly applied) would be discarded. Conversely, the approved images with the sensitive data being replaced/removed could be used as part of the feedback and could be used as part of a new training set for the execution module. Such a variant would greatly speed up the validation process as the user would not be required to edit/correct the incorrectly applied change to the resulting image.

It should be clear that part of the task for the execution module would be to differentiate between the various types of sensitive data. This would be relevant especially for implementations where the sensitive data is replaced by suitable replacement data. As an example, name data should be replaced by suitable name data while address data should be replaced by address data. It would not be suitable to replace name data with address data or vice versa. In one variant of the present invention, a user specifies the type of confidential information to be identified/tagged in the original image.

Figure 5:
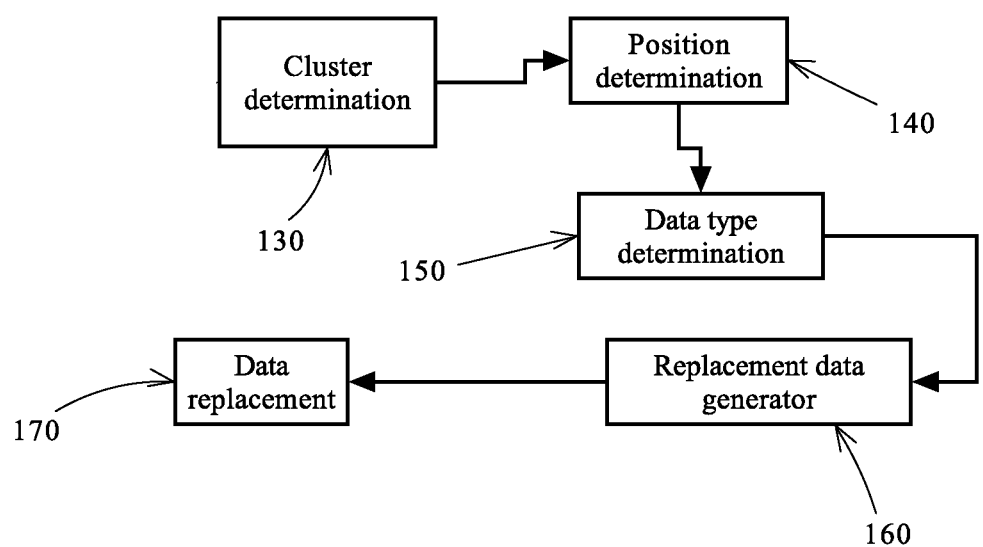
FIG. 5 is a block diagram of submodules which may be used in an execution module as used in the system in FIG. 1.

For clarity, FIG. 5 shows the blocks or stages within the execution module. As can be seen, in FIG. 5, the execution module includes a cluster determination submodule 130, a position determination submodule 140, a data type determination submodule 150, a replacement data generator submodule 160, and a data replacement submodule 170. The cluster determination submodule 130 would determine which areas in the image contain sensitive data based on what the system has learned from the manually tagged data training set. Then, the position for that cluster (and now delimited by a bounding box) is determined by the position determination submodule 140. The data within that cluster (i.e. the data within the bounding box) would then need to be determined as to the type of data (e.g. whether the data is a telephone number, a name, an address, etc., etc.). This is done by way of the data type determination submodule 150. The result of this submodule is then used to generate suitable replacement data using the replacement data generator submodule 160. With the replacement data generated, this replacement data is then inserted into the image using the data replacement submodule 170.

For clarity, the clusters determined by the submodule 130 would correspond to the bounding boxes delineated and referred to above. Thus, the system would learn (through the training data set manually tagged and delineated by a user) which areas to define as a cluster and which would, thus, need a bounding box.

Once the sensitive data has been delineated by bounding boxes (after a user has delineated specific data in a training data set and after the system has been trained using at least that data set), the sensitive data would need to be classified into the different types of sensitive data. The execution module would thus determine which of the data in the bounding blocks consist of sensitive data. Since an initial processing stage has already determined which data types are in within which bounding blocks, a processing stage thus only seeks out the relevant data types. Thus, in one implementation, name data (e.g. proper names and corporate names) and address data (e.g. data that consists of at least a number and a street) are determined. Then, suitable replacement data for each of the sensitive data is generated. This can be done with reference to a database of suitable names and/or name/address elements that can then be used to randomly generate the suitable replacement data. Once the replacement data has been generated for each instance of the sensitive data, the replacement data is then inserted into the image in a suitable manner to thereby mask and/or overwrite or obscure the original sensitive data with the replacement data. As noted above, the system may learn which data types to find and/or replace based on input from a user. This would ensure that a user wishing to only replace sensitive name data in a document image would not have images that have addresses removed/replaced as well.

Referring again to FIG. 5, the initial processing stage would include the cluster determination submodule 130 and the position determination submodule 140. The processing stage would include the data type determination submodule 150, the replacement data generator submodule 160, and the data replacement submodule 170.

It should be clear that randomly generating the replacement data may include the use of a database of name/address elements with elements being randomly selected from the database and then concatenated to generate the replacement data. As an example, a random name may be generated by first selecting a first name from a database of known/common first names (e.g. Bill, William, Jane, Joe, Tom, Stacey, etc., etc.). Then, a database of known/common last names is accessed to randomly select a common/known last name (e.g. Smith, Kim, Park, Singh, Fletcher, Cooper, etc., etc.). These two random elements can then be concatenated to result in a random replacement name that can be used to replace one or more instances of name data in the image of the document. For addresses, a database of known/common street names is accessed to randomly select a street name (e.g. Park, 1st, 2nd, Main, Wall, River, etc., etc.). Another database with common street name extensions is then accessed to find a random street extension (e.g. Street, Avenue, Place, Way, Crescent, etc., etc.). These address elements can then be concatenated to result in a street name. For a street number, a suitable random number generator can generate a street number to be used with the street name. A random city name can also be used in conjunction with the above noted methods for generating addressed. Other randomly generated replacement data can be used to replace other sensitive data. As an example, a randomly generated number can be used in place of an instance of a social insurance number or social security number. With respect to company identities, random company names may also be generated by randomly selecting one or more company name elements from a database and then concatenating these elements to form a random replacement company name Telephone numbers may also be randomly generated or a known fake number may be inserted into the document. As an example, one can randomly generate an area code and use the 555 exchange with a randomly generated four-digit number to result in a known fake number, e.g. (212) 555-4243.

It should, of course, be clear that the contents of the database noted above need not be fake or random data. There may be instances when one desires to insert real data into a document in place of the sensitive data originally present in that document. For such instances, a suitable database containing the real data points that is to be inserted into the documents may be used.

As an alternative to the above, instead of generating a new replacement data point for each piece of sensitive data, a specific replacement name/address can be used for each instance of an address or a name. Thus, as an example for this alternative, each instance of a name would be replaced with a specific name such as John Doe while each instance of an address would be replaced by a specific replacement address such as 742 Evergreen Terrace, Springfield. A specific fake telephone number may also be used to replace all instances of telephone numbers in the document.

For clarity, any of the following may be considered sensitive data in a document and may be replaced by suitable replacement data as noted above: names, addresses, telephone numbers, social insurance/social security numbers, health insurance numbers, license plate numbers, company names, website addresses, email addresses, vehicle identification numbers, IP addresses, insurance policy numbers, credit card numbers, identification card numbers, dates of birth, blood types, bank account data, and medical prescription data. For further clarity, the term "sensitive data" may include not just text data but also image data, audio data, or any type of data that a user, a corporate entity, or an organization may not want to be made available to anyone but himself or itself. Thus, the term "sensitive data" may be defined in a contextual manner such that what may be considered sensitive data in one context may not be considered sensitive data in another context. As well, "sensitive data" may also encompass logos, corporate logos, or any other image that may be present in an image of a document. Thus, if a logo is sensitive data, that that logo may be tagged and/or replaced by suitable replacement data. For logos, suitable replacement data may include a generic logo, a generic image, a suitable generated image, and/or a block that effectively blocks and/or removes the sensitive data from the image of the document.

For even greater clarity, in some implementations, any data that can be deemed to be personal data can be encompassed by the term "sensitive data". It should thus be clear that "personal data" or "sensitive data" may include any information relating to an identified or identifiable natural person and that an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. "Sensitive data" may also encompass personal data relating to the inherited or acquired genetic characteristics of a natural person which give unique information about the physiology or the health of that natural person and which result, in particular, from an analysis of a biological sample from the natural person in question. Similarly, "sensitive data" may also include 'biometric data' or personal data resulting from specific technical processing relating to the physical, physiological or behavioural characteristics of a natural person, which allow or confirm the unique identification of that natural person, such as facial images or dactyloscopic data. "Sensitive data" may also include personal data related to the physical or mental health of a natural person, including the provision of health care services, which reveal information about that person's health status. In addition, "sensitive data" may include data that may be of use in the analysis or identification of or prediction of a natural person's performance at work, economic situation, health, personal preferences, interests, reliability, behaviour, location, or movements.

In one implementation of the present invention, the output of the system is a listing of the various clusters of data within the document. Each cluster's parameters, contents, location/position, and the parameters of the cluster's contents are associated with each cluster. This output can thus be used by a machine learning system to determine the desired and/or relevant contents of document.

For the above implementation, the sensitive data within the various clusters of data within the document can be replaced within the cluster and prior to the data being processed by the machine learning system. Thus, the system of the present invention would process, determine, and locate the sensitive data within a document's image and, prior to the document being processed by a machine learning system that would use the data in the document, the system would replace that sensitive data with suitable replacement data. As such, the sensitive data would not form part of a data set for training the machine learning system. It should be clear, however, that even if the sensitive data itself does not form part of a data set for training, the context or characteristics of the original sensitive data is preserved and forms part of the training data set, especially after the sensitive data has been replaced by replacement data. The characteristics of the sensitive data (e.g. placement, positioning, and nature of the sensitive data) would form part of the training data set but the actual sensitive data itself would not form part of the training data set.

In another implementation, a neural network may be used in the data type determination submodule. The neural network may be tasked with classifying the various clusters as a date cluster, an address cluster, or as a total amount cluster. Clusters that are larger than a certain size (i.e. clusters with more than a predetermined amount of characters) may be discarded as they would constitute body clusters and would not be a date, address, or total amount cluster. The neural network may be trained with a data set that includes different business letters, invoices, receipts, purchase orders, claim forms, pay slips, and other business-type documents whose clusters have already been classified (either manually or automatically) as date, address, and total amount clusters. By using such a data set, the neural network can be trained to determine which of the clusters in a business document contains these data points (i.e. an address, a date, and a total amount).

In yet another variant, the output of the system in FIG. 1 may be used as a suitable input to a neural network for data type determination as noted above. The neural network can then determine which cluster contains which data and, accordingly, which data will need to be processed and/or replaced.

Figure 6:
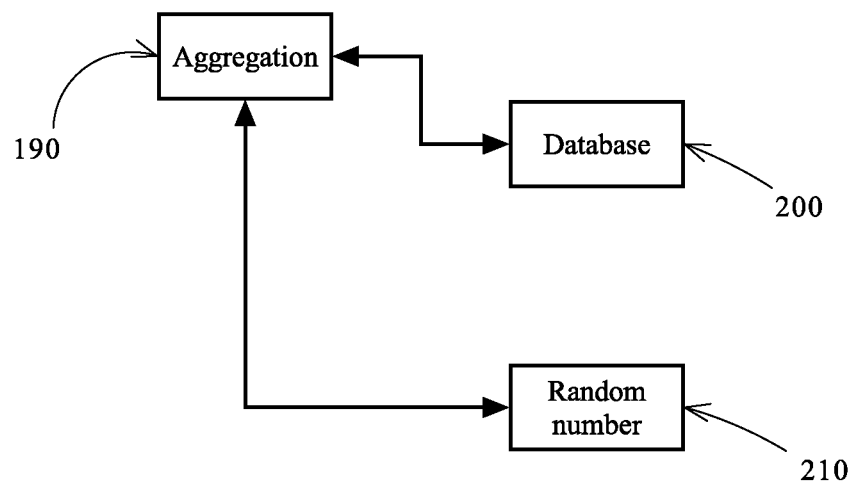
FIG. 6 is a block diagram of submodules in a portion of the system illustrated in FIG. 1.

It should be clear that the replacement data generation submodule 160 may have a configuration as illustrated in FIG. 6. From FIG. 6, it can be seen that the submodule may include an aggregation submodule 190 that receives a request for replacement data. The request would include the type of replacement data being requested (e.g. an address, a name, a telephone number, etc., etc.). Based on this request, suitable replacement data elements may be gathered from a database submodule 200 and suitable number elements may be generated from a random number generator submodule 210. The various replacement data elements are then sent back to the aggregation submodule 190 that then assembles the various elements into a suitable replacement data point. This generated replacement data can then be sent out as an output of the submodule 160.

While the present invention may be suitable for use with OCR (optical character recognition) methods and techniques, it should be clear that the present invention may also be applicable to handwritten text and/or handwritten data. Thus, handwritten text may be recognized and then suitably tagged and replaced by suitable replacement data. Such replacement data may also be processed or generated such that the replacement data inserted into the image looks like or has the characteristics of handwritten text. Of course, the replacement data may also be typed text or other suitable types of text data as necessary or desired.

In yet another alternative, the present invention may be implemented to operate on/use text documents directly instead of operating on/using images of the documents. The text documents can be processed to locate and identify the sensitive data in the document. Where applicable, the clusters of sensitive data may be identified, bounded by a bounding box, and then replaced as necessary. As should be clear, the process used on text documents is similar to that used on images of documents, with the exception that an OCR process will not need to be applied to the text document as the text would no longer need to be recognized as text. An initial version of the text document would be received and processed. Once processing is complete, a sanitized version of the text document would be generated, with the sanitized version being the same as the initial version with the exception that sensitive data in the initial version will be either replaced or removed in the sanitized version of the text document. Of course, for the implementation that works on the images of the document, the initial version of the document and the sanitized version of the document would, again, be different from one another in that sensitive data would be removed or replaced in the sanitized version.

Another alternative implementation of the present invention may use a data generation submodule that generates data without reference to a database. A suitable name/data generation submodule may be used for such an implementation. As an example, a submodule having a generative adversarial network that generates suitable names, addresses, and other data may be used.

As an alternative, while the above discussion details replacing the sensitive data with replacement data that is of the same type as the sensitive data, the sensitive data may also simply be removed from the image of the document. For such an alternative, the sensitive data may be masked by an image block of a solid color to effectively delete the sensitive data from the document. For such an alternative, the replacement data would simply be a digital image block that effectively removes and/or masks the sensitive data.

As a further alternative, the user who manually "tags" or delineates the data in an image may also "tag" that data on a per type basis. This allows the system to learn what data to recognize in images as well as the type of that data. Thus, when replacement data is to be generated, the system can generate the correct type of replacement data. Names would therefore not be replaced with generated address in the sanitized image.

Figure 7:
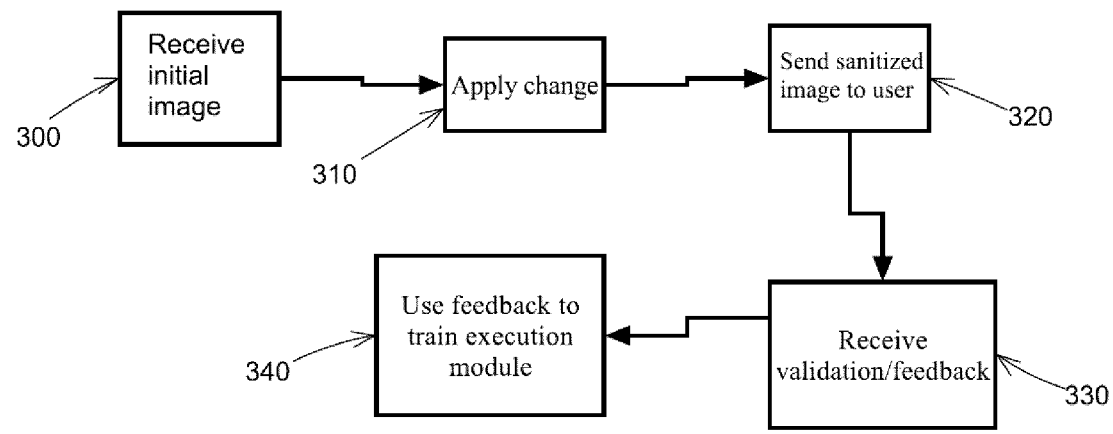
FIG. 7 is a flowchart of a method according to another aspect of the present invention.

Referring to FIG. 7, a flowchart detailing the steps in a method according to another aspect of the present invention is illustrated. The method begins at step 300, that of receiving an initial image of a document with sensitive data. This initial image is then sent to an execution module where one or more changes are applied to the image (step 310). As noted above, this change is based on the data sets that the execution module has been trained with. The change may be the replacement or removal of various sensitive data in the image of the document. Once this change has been applied to the initial image, the resulting sanitized image is sent to a user (step 320) for validation. Step 330 is that of receiving the user's feedback regarding the application of the change to the initial image. As noted above, the feedback can include the user's validation (i.e. approval) of the resulting sanitized image or it can include the user's edits/correction of the changes applied. This feedback can then be used to further train the execution module (step 340).

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "Cr"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for replacing sensitive data in an image of a document, the method being executed by at least one processor, the method comprising:
   a) receiving an initial image of said document;
   b) applying at least one change to said initial image to result in a sanitized image of said document by:
      using a trained convolutional neural network, determining areas comprising sensitive data in the initial image of the document by delineating the areas;
      using the trained convolutional neural network, determining at least one type of sensitive data in the areas comprising the sensitive data; and
      using a trained generative adversarial network, generating, based on the at least one type of sensitive data, suitable replacement data for the sensitive data for applying the at least one change to obtain the sanitized image of said document;
   c) sending said sanitized image to a user for validation;
   d) receiving user feedback regarding said sanitized image;
   e) using said user feedback to further train at least one of said trained convolutional neural network and said trained generative adversarial network,
   wherein said feedback used in step e) comprises at least one addition of a delineation of sensitive data that has not been removed or replaced in said initial image;
   wherein said at least one change includes an effective removal or a replacement of said sensitive data in said image.

2. The method according to claim 1, wherein said user feedback comprises corrections to said change.

3. The method according to claim 1, wherein said change comprises at least one of:
   adding at least one bounding box to a cluster of sensitive data in said initial image, sensitive data within said at least one bounding box being for effective removal or replacement with non-sensitive replacement data;
   masking at least one cluster of sensitive data in said document such that said sensitive data is obfuscated or is otherwise unreadable; and
   placing a border around at least one element in said initial image, said at least one element comprising said sensitive data such that said at least one element is for effective removal or replacement in said image.

4. The method according to claim 1, wherein said feedback consists of an approval or a rejection of said at least one change.

5. The method according to claim 1, wherein said sensitive data of at least one specific type of data comprises at least one of:
   names of persons;
   addresses of persons;
   gender;
   confidential information;
   physical characteristics;
   financial information;
   health related information;
   business related information;
   names of corporate entities;
   addresses of corporate entities;
   dates;
   credit card numbers;
   bank account data;
   social security/social insurance numbers;
   personal identification data; and
   blood types.

6. The method according to claim 1, wherein said sensitive data is replaced by replacement data and elements of said replacement data are randomly selected.

7. The method according to claim 1, wherein said sensitive data is replaced by replacement data and at least portion of said replacement data is randomly generated.

8. The method according to claim 1, wherein said sensitive data is replaced by replacement data and said replacement data is a block that effectively removes said sensitive data from said image.

9. A system for use in replacing sensitive data in a document, the system comprising:
   a non-transitory storage medium storing computer-readable instructions thereon;
   and at least one processor operatively connected to the non-transitory storage medium, the at least one processor, upon executing the computer-readable instructions, being configured for:
   receiving an initial image of said document and for applying at least one change to said initial image to result in a sanitized image by:
      using a trained convolutional neural network, determining areas comprising sensitive data in the initial image of the document by delineating the areas;
      using the trained convolutional neural network, determining at least one type of sensitive data in the areas comprising the sensitive data; and
      using a trained generative adversarial network, generating, based on the at least one type of sensitive data, suitable replacement data for the sensitive data for applying the at least one change to obtain the sanitized image of said document;
   sending said sanitized image of said document to a user for validation and for receiving feedback from said user;
   wherein:
   said feedback comprises at least one addition of a delineation of sensitive data that has not been removed or replaced in said initial image;

said feedback is used for further training at least one of said trained convolutional neural network and said trained generative adversarial network; and said at least one change includes an effective removal or a replacement of said sensitive data in said document.

10. The system according to claim 9, further comprising storing said feedback received from said user in said non-transitory storage medium.

11. The system according to claim 9, further comprising receiving said feedback from said user and continuously training said at least one of said trained convolutional neural network and said trained generative adversarial network for adjusting a behaviour of said at least one said trained convolutional neural network and said trained generative adversarial network based on said feedback.

12. The system according to claim 9, wherein said sensitive data of at least one specific type of data comprises at least one of:
- names of persons;
- addresses of persons;
- gender;
- confidential information;
- physical characteristics;
- financial information;
- health related information;
- business related information;
- names of corporate entities;
- addresses of corporate entities;
- dates;
- credit card numbers;
- bank account data;
- social security/social insurance numbers;
- personal identification data; and
- blood types.

13. The system according to claim 9, wherein said document is received and processed by said system as a digital image of said document.

14. A method for replacing sensitive data in a document, the method being executed by at least one processor, the method comprising:
a) receiving an initial version of said document;
b) applying at least one change to said initial version to result in a sanitized version of said document by:

using a trained convolutional neural network, determining areas comprising sensitive data in the initial version of the document by delineating the areas;

using the trained convolutional neural network, determining at least one type of sensitive data in the areas comprising the sensitive data; and using a trained generalive adversarial network, generating, based on the at least one type of sensitive data, suitable replacement data for the sensitive data for applying the at least one change to obtain the sanitized version of said document;

c) sending said sanitized version to a user for validation;
d) receiving user feedback regarding said sanitized version;
e) using said user feedback to further train at least one of said trained convolutional neural network and said trained generative adversarial network;

wherein said feedback used in step e) comprises at least one addition of a delineation of sensitive data that has not been removed or replaced in said initial version;

wherein said at least one change includes an effective removal or a replacement of said sensitive data in said document.

* * * * *